Dec. 10, 1963   P. F. BOHNENKAMP   3,113,785
BICYCLE EXTENSION
Filed July 10, 1962
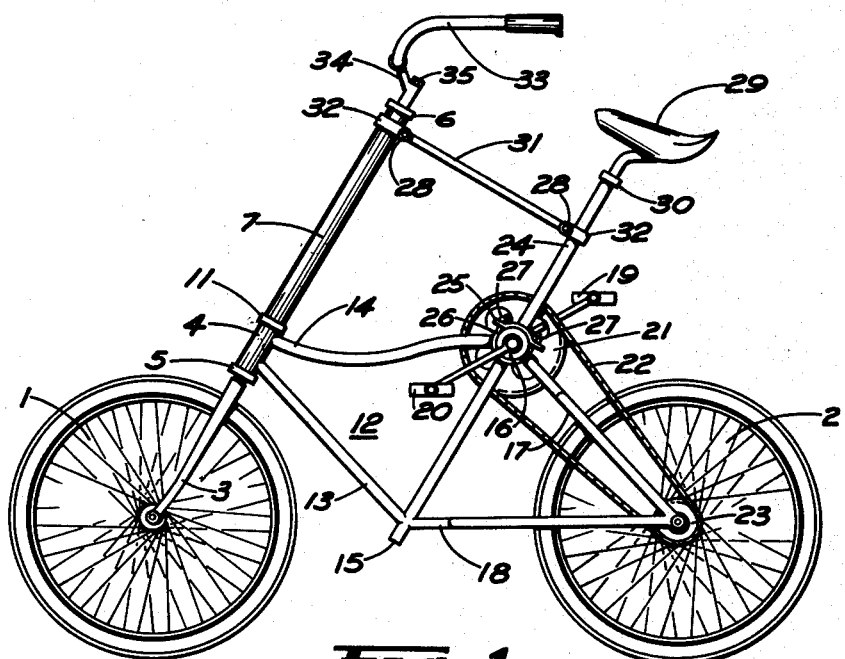
Fig-1
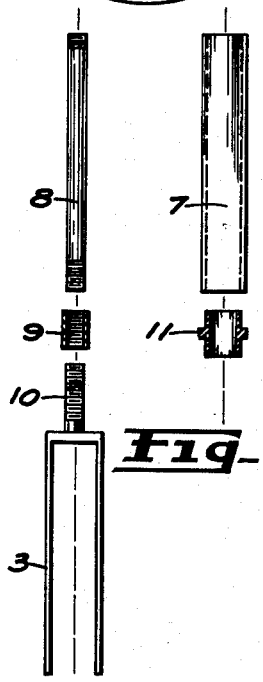
Fig-5
Fig-2
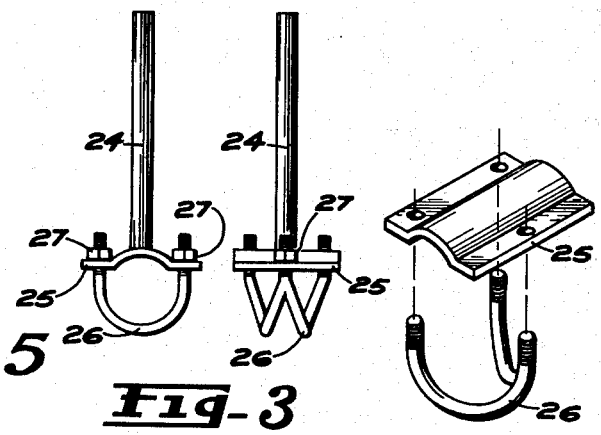
Fig-3
Fig-4
PAUL F. BOHNENKAMP
INVENTOR
BY *Wm. T. Metz*
ATTORNEY 3,113,785
BICYCLE EXTENSION
Paul F. Bohnenkamp, 1607 Ave. F,
Fort Madison, Iowa
Filed July 10, 1962, Ser. No. 208,781
3 Claims. (Cl. 280—7.15)

This invention pertains to bicycles and more particularly to an extension which will enable the bicycle to be converted from a standard bicycle to an elevated bicycle.

Heretofore bicycles have been used as manufactured and extension kits therefor have not been known to the art. It is desirable from time to time to convert a bicycle after manufacture to an elevation higher than the design of the bicycle. This could only be accomplished with relatively large expense in the way of welding or converting permanently and could not be done by the use of simple hand tools together with a kit of simple materials for such extension.

It is therefore an object of this invention to provide a means for elevating the heighth of the seat and handle bars of a bicycle in relation to the pedals and wheels over the adjustment built into the bicycle.

It is a further object of this invention to elevate the heighth of the seat and handle bars of a bicycle in relation to the pedals and wheels by the use of an extension kit that will fit all makes of bicycles.

It is a further object of this invention to provide a means for elevating the seat and handle bars of a bicycle in relation to the wheels and pedals and then be able to make the conversion back without making any structural changes in the basic framework of the bicycle.

Further objects and advantages of the invention will become more apparent from the following drawings, descriptions and claims.

FIG. 1 is a side view of a bicycle after the conversion from a standard bicycle has been made. FIG. 2 is an exploded view of the inner conversion units above the front wheel of the bicycle. FIG. 3 is a front and a side view of the conversion unit above the pedals of the bicycle. FIG. 4 is an exploded view of the fastening means for the conversion unit above the pedals of the bicycle. FIG. 5 is an exploded view of the outer conversion units above the front wheel of the bicycle.

In the drawings a converted bicycle is shown having a front wheel 1 and a back wheel 2. The front wheel is attached at its center to a fork 3. The fork 3 fits into a fork housing 4. Before conversion bearing housing 5 is located at the top of the fork housing 4 and bearing housing 6 is located at the bottom of the fork housing 4. After conversion bearing housing 5 is located at the bottom of the fork housing 4 which is inverted and bearing housing 6 is moved to the top of the housing extension 7. Coupling 9 connects fork extension 8 to the threaded portion 10 of the fork 3. Flanged tube 11 fits in the lower end of housing extension 7 and the upper end of fork housing 4.

The frame 12 of the bicycle is comprised of support members 13, 14, seat support member 15, fork housing 4, crank housing 16 and back forks 17 and 18. The frame 12 upon conversion is inverted so that the seat support member 15 is pointed downward rather than upward in its standard or regular assembly. Pedals 19 and 20 are attached to the frame 12 through the crank housing 16. Pedal 19 is attached to the front sprocket 21 which is linked by chain 22 to the back sprocket 23. The back sprocket 23 is attached by means of an axle to the back forks 17 and 18.

Seat extension 24 has plate 25 as an integral part at its lower extremity. The plate 25 of seat extension 24 is bolted onto the crank housing 16 by means of the three pronged U-bolt 26 and the nuts 27. The seat 29 and tightening collar 30 are removed from seat support member 15 and inserted in the uppermost end of the seat extension 24. Cross bar 31 has clamps 32 at each end thereof designed to clamp to the housing extension 7 and the seat extension 24. The clamps 32 are tightened by means of the round nuts 28.

The conversion of a standard bicycle to the elevated bicycle is accomplished by removing the fenders from the bicycle if it has any and reversing the rear wheel 2 in the back forks 17 and 18. This will put the back sprocket 23 on the opposite side of the frame 12 from its original position with relation to the frame 12. The pedals 19 and 20 are removed from the crank housing 16 together with the front sprocket 21 and reversed so that the front sprocket 21 will also be on the opposite side of the frame 12 from its original position with relation to the frame 12. The handle bar 33 and gooseneck 34 are removed from the fork housing 4 by loosening the nut 35. The fork 3 and front wheel 1 are removed from the housing 4 in one piece. The frame 12 is then inverted and the fork 3 is inserted in the fork housing 4 as shown in FIG. 1. The bearing housing 5 is located between the fork housing 4 and the fork 3. The coupling 9 is then screwed onto the fork extension 8 and the threaded portion 10 of the fork 3. The flanged tube 11 is inserted into the end of the fork housing 4 opposite the bearing housing 5 and the housing extension 7 is placed over the flanged tube 11 and the fork extension 8. The bearing housing 6 removed from the housing 4 is placed at the top of the housing extension 7 in the same fashion as it is installed in the top of the housing 4 when the bicycle is regularly assembled. The handle bar 33 and gooseneck 34 are then placed into the top of the housing extension 7 also in the same fashion as when the bicycle is regularly assembled. The fork housing 4, flanged tube 11 and housing extension 7 are now held in fixed relation to each other. The fork 3, coupling 9, fork extension 8, gooseneck 34 and handle bar 33 are also now held in fixed relation to each other but are free to turn in the fork housing 4, flanged tube 11 and housing extension 7.

The seat extension 24 is fastened to the crank housing 16 by placing the three pronged U-bolt 26 around the crank housing 16 and through the holes in the plate 25 and then tightening the nuts 27 onto the three pronged U-bolt 26. The three pronged U-bolt 26 fits through the prongs of the back fork 17 and around the support member 14 and seat support member 15 of the frame 12.

The cross-bar 31 is then installed between the seat extension 24 and the housing extension 7. The round nuts 28 and the nuts 27 may be tightened in relation to each other to give proper position to the seat extension 24 and the housing extension 7. The seat 29 is placed in the seat extension 24 and adjusted for proper height and position by tightening collar 30.

The bicycle has now been elevated by the heighth of the seat extension 24 and the housing extension 7. It is rigid and can be ridden as a normal bicycle, but now at an elevated height. There have been no mechanical changes in any of the parts or fittings of the bicycle and the bicycle can thus be converted back to standard size by simply reversing the conversion process as outlined above.

I claim:
1. A bicycle extension comprised of a fork extension disposed so as to be coupled to a bicycle fork so as to elevate a handle bar attached to the fork extension, a housing extension extending a steering housing of an inverted bicycle frame so as to receive the fork extension when coupled to the bicycle fork, a flanged tube disposed so as to fit between the housing extension and the steering housing and a seat extension fastened to a crank housing of the inverted bicycle frame so as to elevate a seat received therein.

2. A bicycle extension comprised of a fork extension to elevate a handle bar attached thereto, a coupling to connect the fork extension to a bicycle fork, a housing extension extending a steering housing of an inverted bicycle frame so as to receive the fork extension when coupled to the bicycle fork, a flanged tube disposed so as to fit into and between the housing extension and steering housing, a seat extension having a plate as an integral part thereof, the plate of the seat extension fastened by means of a three pronged U-bolt to a crank housing of the inverted bicycle frame so as to elevate a seat received therein.

3. An elevated bicycle comprised of a frame that has been inverted having a fork, a fork housing, pedals and a crank housing, a fork extension having an upper end and a lower end, the lower end of the fork extension coupled to the fork, a handle bar attached to the upper end of the fork extension, a housing extension having an upper end and a lower end, the lower end of the housing extension coupled to the fork housing, the fork extension protruding into the housing extension with the handle bar positioned at the upper end of the housing extension, a seat extension fastened to the crank housing, a seat attached to the seat extension and two wheels attached to the frame.

References Cited in the file of this patent

UNITED STATES PATENTS

| | | |
|---|---|---|
| 2,482,472 | Fried | Sept. 20, 1949 |
| 2,773,695 | Holloway | Dec. 11, 1956 |
| 2,798,739 | Schreckengost et al. | July 9, 1957 |
| 2,993,709 | Wick | July 25, 1961 |

FOREIGN PATENTS

| | | |
|---|---|---|
| 1,071,281 | France | Mar. 3, 1954 |